US009657865B2

(12) United States Patent
Tischler et al.

(10) Patent No.: US 9,657,865 B2
(45) Date of Patent: May 23, 2017

(54) TWO-STAGE VALVE ACTUATION SYSTEM

(71) Applicant: Federal Signal Corporation, Oak Brook, IL (US)

(72) Inventors: Dieter A. Tischler, Houston, TX (US); Derek Bade, Murray Bridge (AU)

(73) Assignee: Federal Signal Corporation, Oak Brook, IL (US)

( * ) Notice: Subject to any disclaimer, the term of this patent is extended or adjusted under 35 U.S.C. 154(b) by 84 days.

(21) Appl. No.: 14/738,068

(22) Filed: Jun. 12, 2015

(65) Prior Publication Data

US 2016/0363235 A1 Dec. 15, 2016

(51) Int. Cl.
*F16K 31/44* (2006.01)
*F16K 31/62* (2006.01)
*F16K 35/10* (2006.01)
*G05G 1/30* (2008.04)

(52) U.S. Cl.
CPC .............. *F16K 31/62* (2013.01); *F16K 35/10* (2013.01); *G05G 1/30* (2013.01)

(58) Field of Classification Search
CPC .......... G05G 1/44; G05G 17/00; G05G 1/445; G05G 5/00; F16K 31/32; F16K 35/02; F16K 31/62; F16K 35/10; G05D 1/30
USPC ..... 137/343; 251/99, 279, 280, 295; 74/512, 74/561
See application file for complete search history.

(56) References Cited

U.S. PATENT DOCUMENTS

| | | | | |
|---|---|---|---|---|
| 2,183,032 A | * | 12/1939 | Roycroft | ............... F16K 35/025 251/109 |
| 3,759,115 A | * | 9/1973 | Dibonaventura | ........ G05G 1/60 74/512 |
| 3,916,722 A | | 11/1975 | Grobe | |
| 4,976,166 A | * | 12/1990 | Davis | ...................... F02D 41/28 338/153 |
| 5,083,069 A | | 1/1992 | Jimenez et al. | |
| 5,166,513 A | | 11/1992 | Keenan et al. | |
| 5,423,348 A | | 6/1995 | Jezek et al. | |
| 5,807,077 A | | 9/1998 | Lamanna | |
| 6,182,686 B1 | | 2/2001 | Jezek | |

FOREIGN PATENT DOCUMENTS

| | | |
|---|---|---|
| GB | 227372 | 1/1925 |
| WO | WO 2004/088185 A1 | 10/2004 |
| WO | WO 2009/047701 A2 | 4/2009 |
| WO | WO 2014/189655 A1 | 11/2014 |

OTHER PUBLICATIONS

Bernstein Foot switches Complete Range, 40 pages (Jan. 2015).
International Search Report and Written Opinion for Application No. PCT/US2015/035545 mailed Feb. 26, 2016.

* cited by examiner

*Primary Examiner* — Umashankar Venkatesan
(74) *Attorney, Agent, or Firm* — Merchant & Gould P.C.

(57) ABSTRACT

A two-stage valve system includes a safety latch configured to at least partially cover an actuation lever, such as a foot pedal, to prevent inadvertent operation of the actuation lever. The safety latch needs to be lifted to a certain level to gain access to the actuation lever in a first stage, and then the actuation lever is operated to actuate a valve assembly in a second stage.

20 Claims, 9 Drawing Sheets

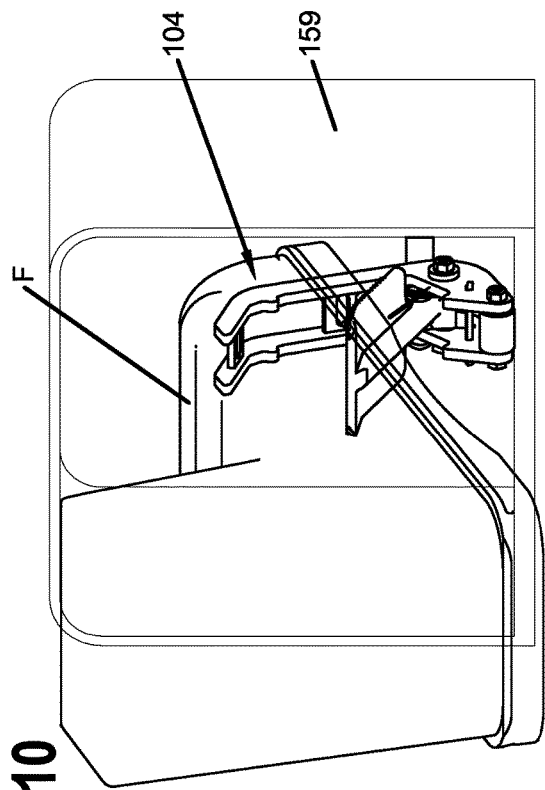
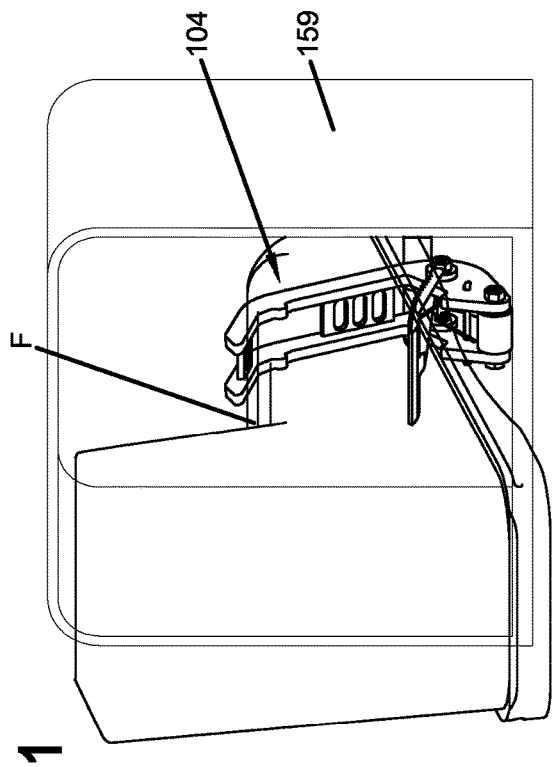
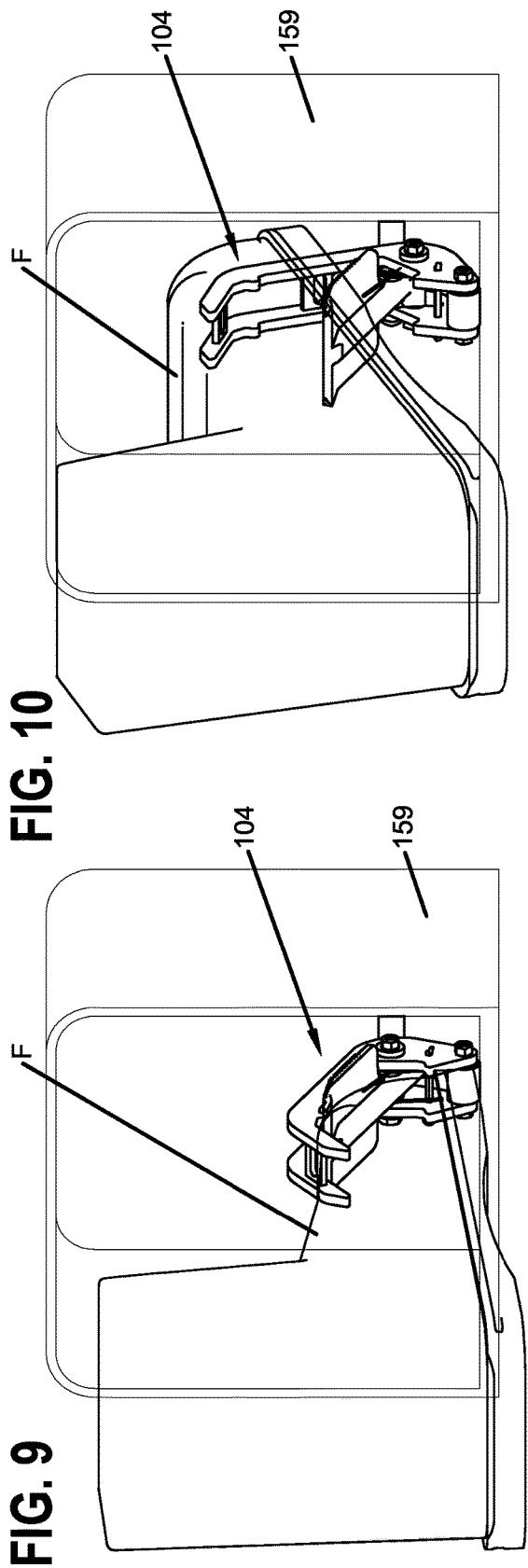
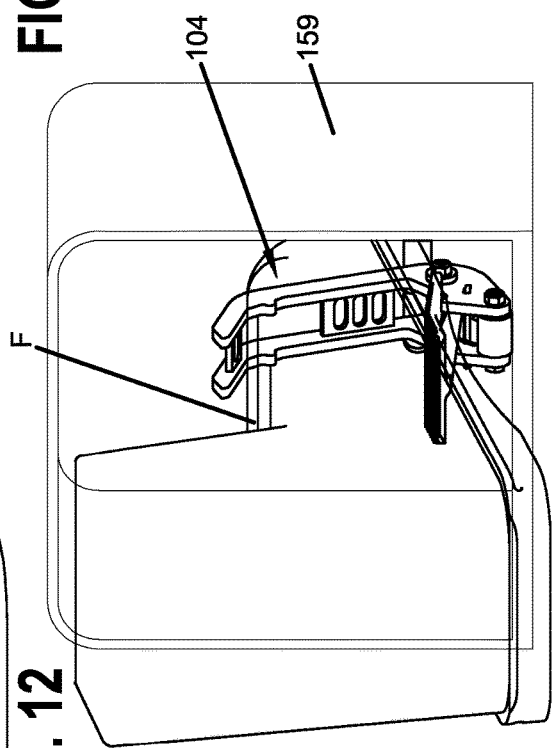

TWO-STAGE VALVE ACTUATION SYSTEM

BACKGROUND

Waterblasting devices typically include a valve assembly and a trigger element for actuating the valve assembly to direct a high-pressure blast of fluid, such as water, against various surfaces such as concrete, metal, and the inside of tubes and vessels.

Certain examples of waterblasting devices use a foot-operated valve assembly where an operator needs to operate a cleaning lance by hand. The foot-operated valve assembly typically includes a base, a valve mounted to the base, and a pedal for operating the valve. The valve is actuated when an operator simply depresses the pedal, and a high-pressure fluid is developed at the cleaning lance at hand.

In operation, operators can inadvertently step on the foot pedal, thereby actuating the valve and building up high pressure of fluid in the lance. Operators are typically unsupported when operating waterblasting devices where there is no structure for the operators to grasp or lean against in the field. These operators can frequently lose their balance during operation and accidently actuate the foot pedal.

SUMMARY

In general terms, this disclosure is directed to a two-stage valve actuation system. In one possible configuration and by non-limiting example, the valve actuation system includes a safety latch configured to at least partially cover an actuation lever, such as a foot pedal, to prevent inadvertent operation of the actuation lever. The safety latch needs to be lifted to gain access to the actuation lever in a first stage, and then the actuation lever is operated to actuate a valve assembly in a second stage. Various aspects are described in this disclosure, which include, but are not limited to, the following aspects.

One aspect is an apparatus for actuating a valve assembly. The apparatus may include an actuation lever, a safety latch, and a biasing member. The actuation lever has a first lever portion and a second lever portion. The actuation lever is pivotally connected to the valve assembly at the first lever portion, and the second lever portion is operated such that the actuation lever pivots between a first lever position and a second lever position. In the first lever position, the first lever portion disengages the valve assembly to prevent fluid flow through the valve assembly, and in the second lever position, the first lever portion engages the valve assembly to permit fluid flow through the valve assembly. The safety latch has a first latch portion and a second latch portion. The safety latch is pivotally connected to the actuation lever to pivot between a first latch position and a second latch position. In the first latch position, the actuation lever is in the first lever position, the second latch portion covers at least a portion of the second lever portion, and the first latch portion is configured to prevent the actuation lever from pivoting from the first lever position to the second lever position. In the second latch position, the second latch portion is lifted away from the second lever portion and the actuation lever is in the second lever position. The biasing member is engaged between the actuation lever and the safety latch and configured to bias the actuation lever to the first lever position and the safety latch to the first latch position.

Another aspect is a method of actuating a valve assembly. The method may begin with providing an actuation device. The actuation device may include an actuation lever having a first lever portion and a second lever portion and pivotally connected to the valve assembly at the first lever portion; a safety latch having a first latch portion and a second latch portion, the safety latch pivotally connected to the actuation lever between the first and second latch portions; and a biasing member engaged between the actuation lever and the safety latch. The method may further include raising the second latch portion of the safety latch from a first latch position to pivot about the actuation lever until the second lever portion is accessible; and depressing the second lever portion of the actuation lever from a first lever position to enable the actuation lever to pivot about the valve assembly until the first lever portion engages and actuates the valve assembly to permit fluid flow therethough; and releasing the second lever portion of the actuation lever to enable the actuation lever return to the first lever position and the safety latch to return to the first latch position by the biasing member.

Yet another aspect is a valve system. The valve system may include a valve assembly, an actuation lever, a safety latch, and a biasing member. The valve assembly may include a valve body and a valve closure element received in the valve body. The valve closure element is movable between a first valve position in which the valve closure element closes the valve assembly to prevent fluid flow therethrough and a second valve position in which the valve closure element opens the valve assembly to permit fluid flow therethrough. The actuation lever has a first lever portion and a second lever portion. The actuation lever is pivotally connected to the valve body at the first lever portion, and the second lever portion is operated such that the actuation lever pivots between a first lever position and a second lever position. In the first lever position, the first lever portion disengages the valve assembly to prevent fluid flow through the valve assembly. In the second lever position, the first lever portion engages the valve assembly to permit fluid flow through the valve assembly. The safety latch has a first latch portion and a second latch portion. The safety latch is pivotally connected to the actuation lever to pivot between a first latch position and a second latch position. In the first latch position, the actuation lever is in the first lever position, the second latch portion covers at least a portion of the second lever portion, and the first latch portion is configured to prevent the actuation lever from pivoting from the first lever position to the second lever position. In the second latch position, the second latch portion is lifted away from the second lever portion and the actuation lever is in the second lever position. The biasing member is engaged between the actuation lever and the safety latch and configured to bias the actuation lever to the first lever position and the safety latch to the first latch position.

BRIEF DESCRIPTION OF THE DRAWINGS

FIG. 9 illustrates an example operation of the actuation device using an operator's foot.

FIG. 10 illustrates a different position of the actuation device of FIG. 9.

FIG. 11 illustrates a different position of the actuation device of FIG. 9.

FIG. 12 illustrates a different position of the actuation device of FIG. 9.

DETAILED DESCRIPTION

Figure 1:
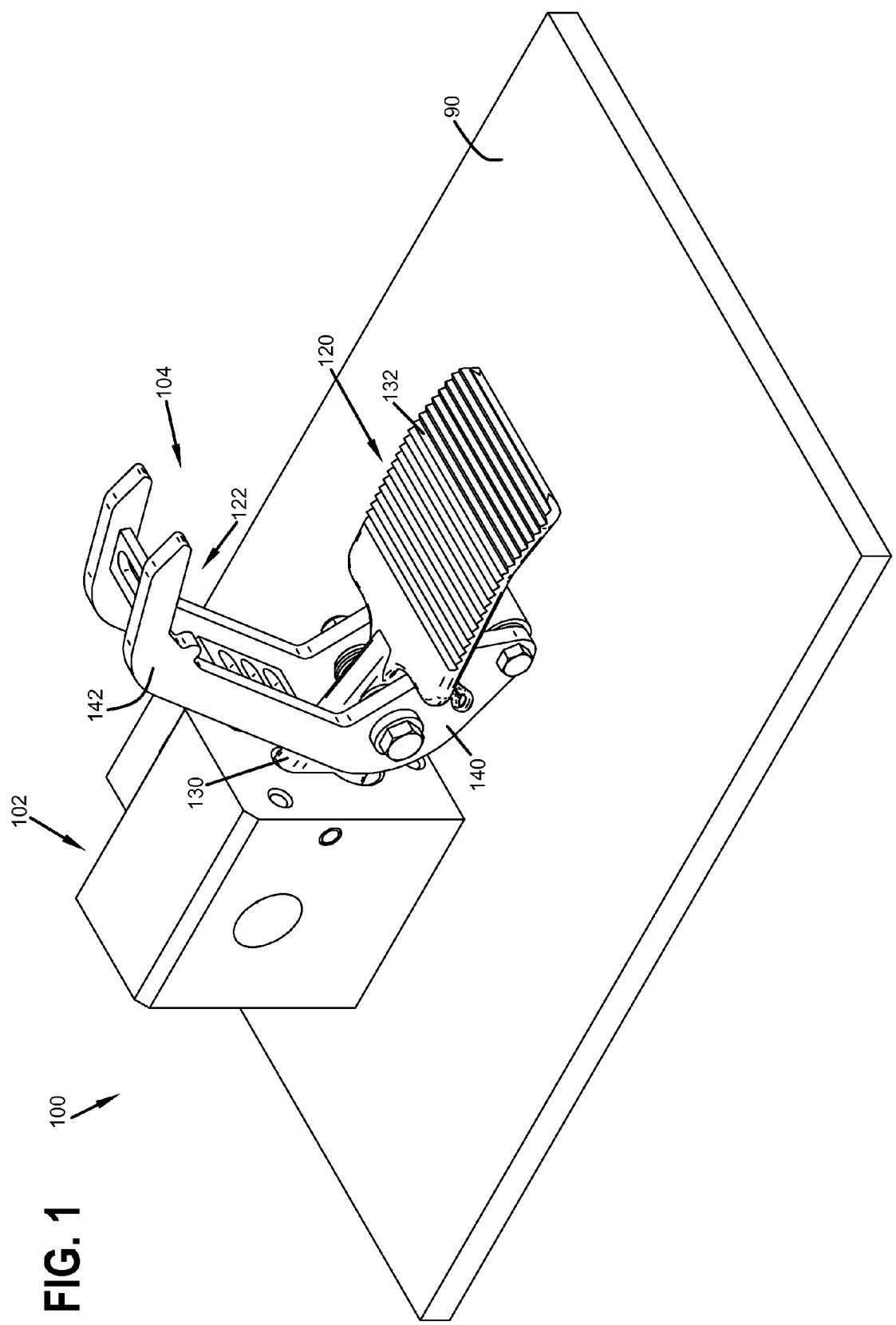
FIG. 1 is a schematic perspective view of an example valve system in accordance with the present disclosure.

Various embodiments will be described in detail with reference to the drawings, wherein like reference numerals represent like parts and assemblies throughout the several views.

Figure 2:
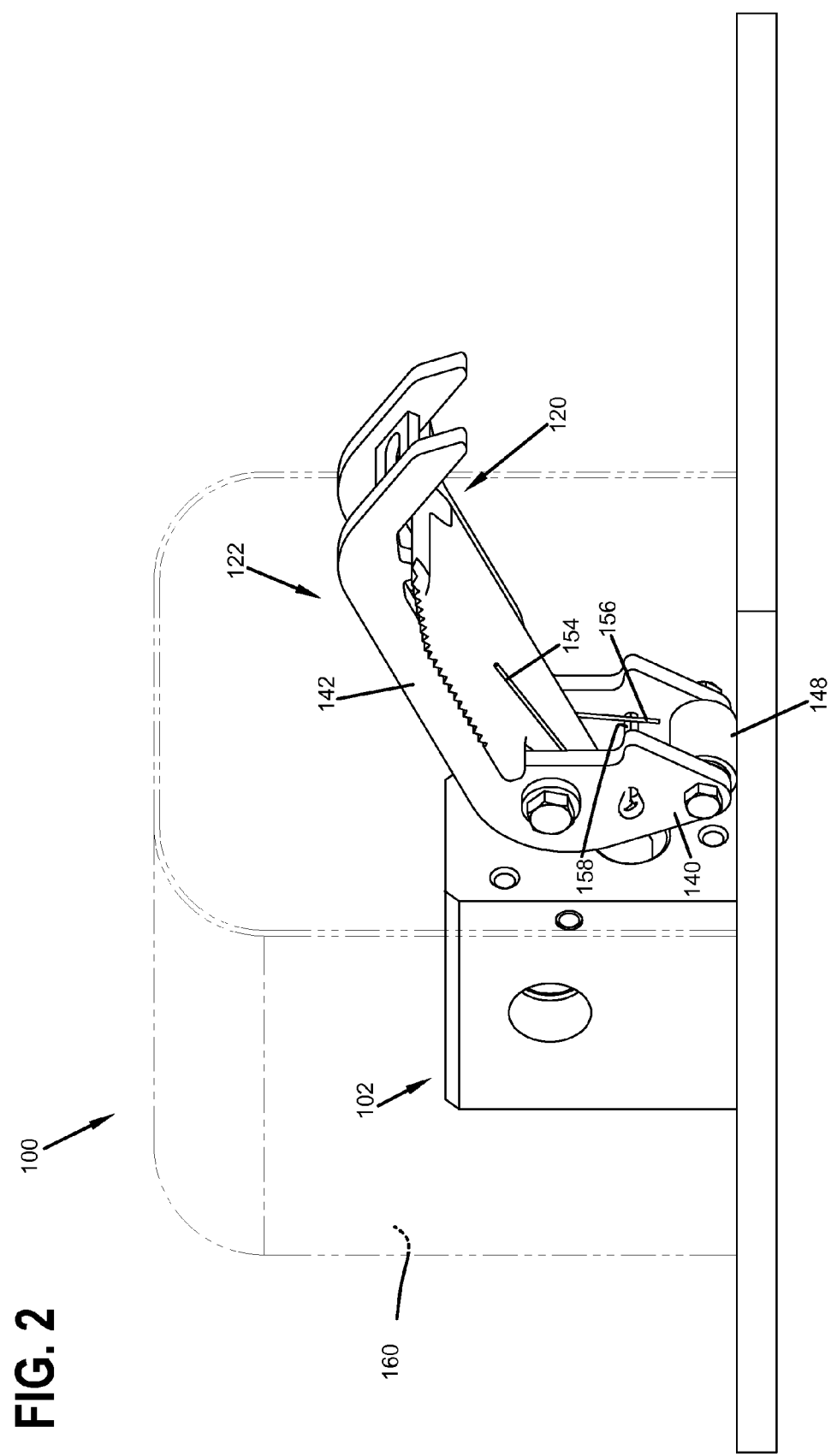
FIG. 2 is a perspective view of an example actuation device of the valve system of FIG. 1.
Figure 3:
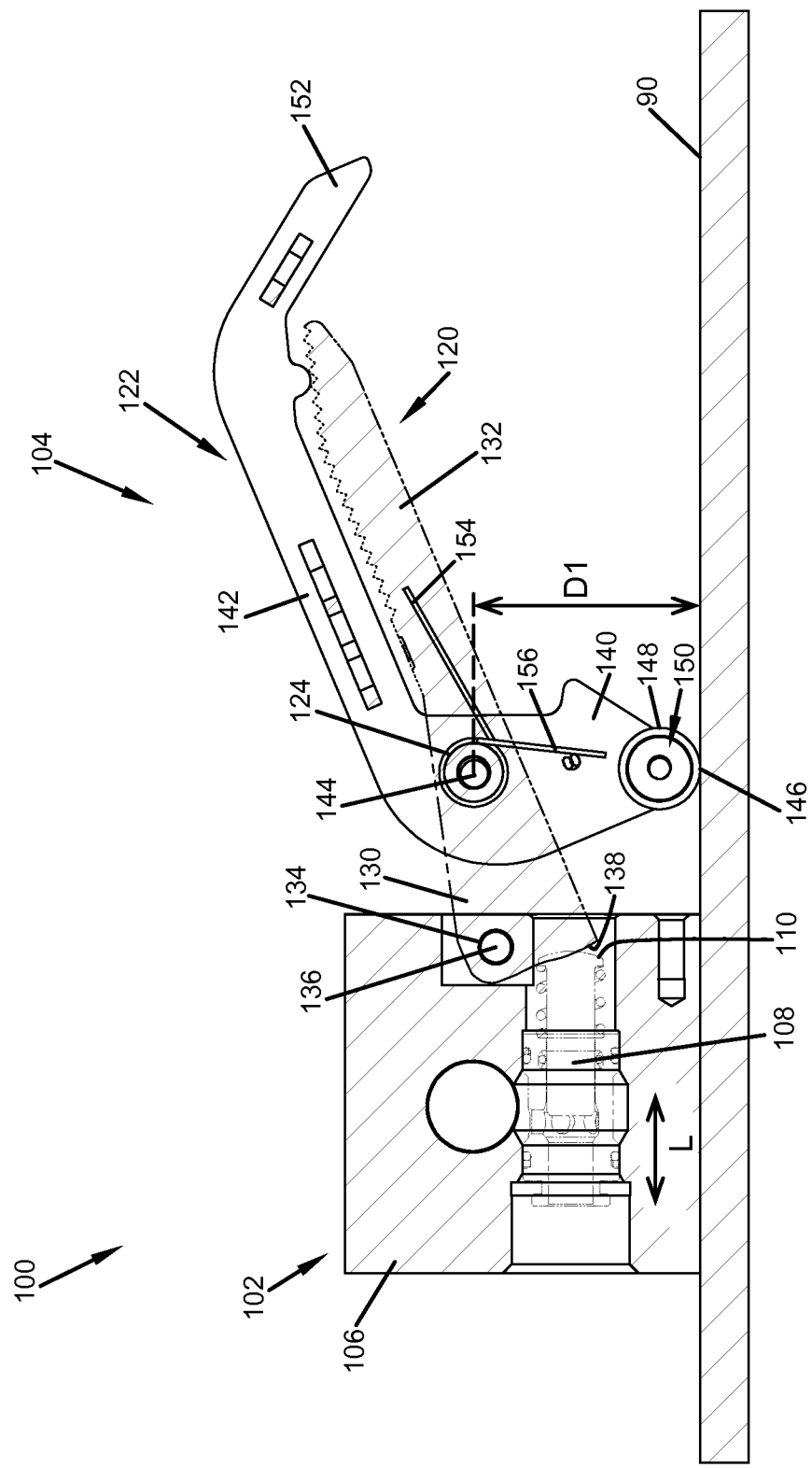
FIG. 3 is a schematic side view of the valve system of FIG. 1.
Figure 4:
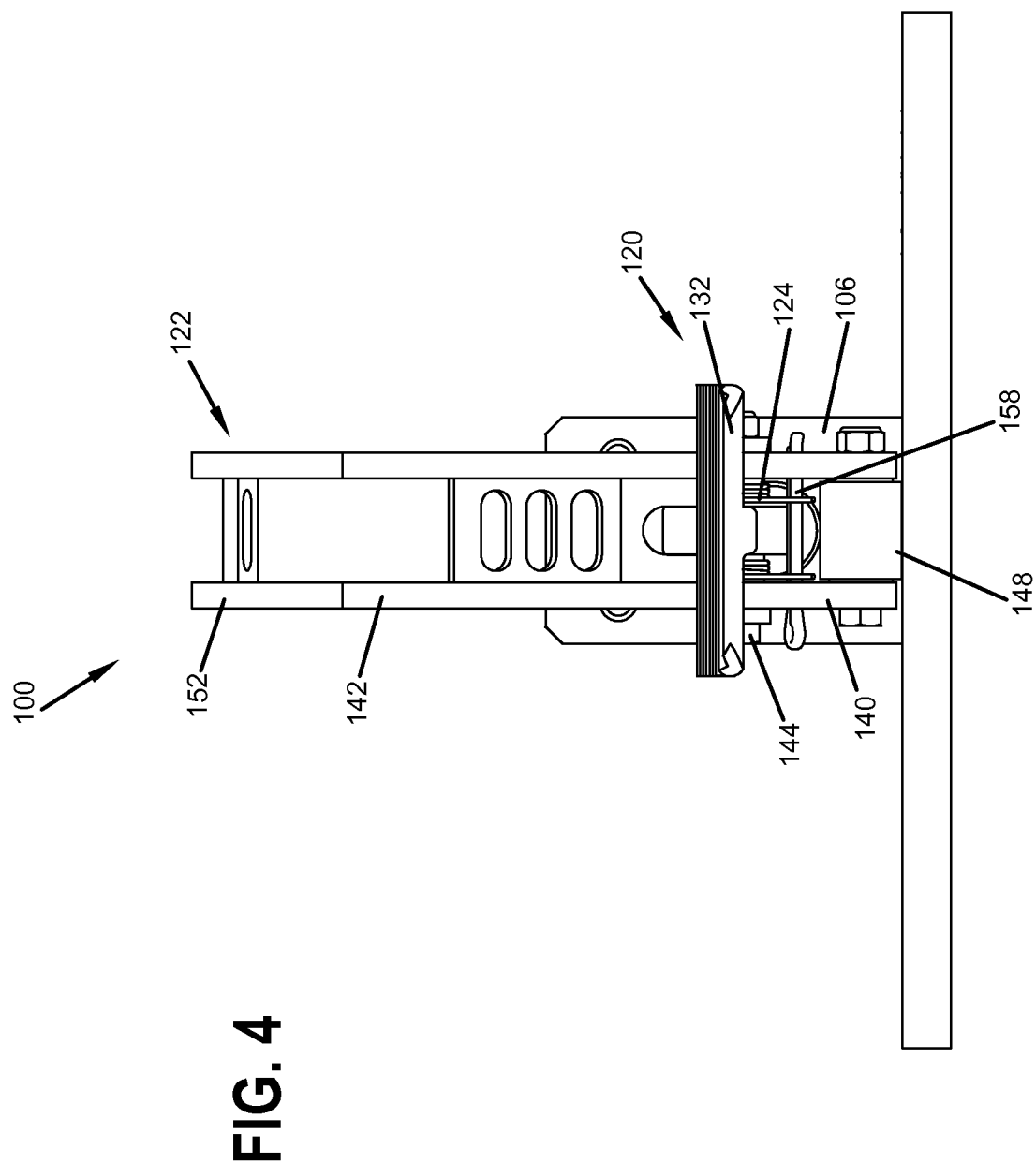
FIG. 4 is a schematic front view of the valve system of FIG. 1.

Referring to FIGS. 1-4, an example valve system 100 is described. In particular, FIG. 1 is a schematic perspective view of an example valve system 100 in accordance with the present disclosure. FIG. 2 is a perspective view of an example actuation device of the valve system 100. FIG. 3 is a schematic side view of the valve system 100 of FIG. 1. FIG. 4 is a schematic front view of the valve system 100 of FIG. 1.

In some examples, the valve system 100 is configured to direct a high pressure blast of a fluid, such as water, against various surfaces, such as concrete, metal, and the inside of tubes and vessels, to clean coatings, deposits, seals, and other unwanted deposits therefrom. A fluid stream used in the cleaning operation can has a pressure in the range about 5,000-20,000 psi in some examples. Such high pressure fluid streams can be controlled by the valve system 100.

In some examples, the valve system 100 can include a valve assembly 102 and an actuation device 104. Some examples of the valve assembly 102 are illustrated in U.S. Pat. No. 6,182,686, titled FOOT VALVE SAFETY COVER APPARATUS, issued Feb. 6, 2001, and U.S. Pat. No. 5,423,348, titled SHUT-IN SPRAY GUN FOR HIGH PRESSURE WATER BLAST CLEANING, issued Jun. 13, 1995, the disclosure of which are incorporated herein by reference in their entireties. Other configurations of the valve system 100 are also possible.

As schematically illustrated in FIG. 3, the valve assembly 102 can include a valve body 106 and a valve closure element 108. The valve body 106 defines an inlet port for a source of fluid (e.g., water) under high pressure and an outlet port for discharging fluid under high pressure through a hose or tubing to a spray gun or cleaning lance (not shown). The valve closure element 108 is supported within the valve body 106 and movable to selectively open a passage between the inlet and the outlet to permit fluid flow through the valve assembly 102 and close the passage to prevent fluid flow therethrough.

In some embodiments, the valve closure element 108 is configured to slide along a length L (FIG. 3) thereof to selectively open and close the valve assembly 102. By way of example, the valve closure element 108 is configured to engage the actuation device 104 such that the actuation device 104 moves the valve closure element 108 between a first valve position and a second valve position. As described below, the actuation device 104 can engage a head portion 110 of the valve closure element 108. In the first valve position, the valve closure element 108 closes the valve assembly 102 to prevent fluid flow therethrough. In the second valve position, the valve closure element 108 opens the valve assembly 102 to permit fluid flow therethrough. In some embodiments, the valve closure element 108 can move gradually between the first and second valve positions, such that the valve closure element 108 adjusts the amount of fluid flowing through the valve assembly 102 depending on the position of the valve closure element 108 between the first and second valve positions. The valve closure element 108 can be biased to the first valve position.

The valve assembly 102 as described above can be referred to as a shut-in type valve (i.e., the valve is closed to stop fluid flow when the foot pedal is released to its upward position, and the valve is open to permit fluid flow when the foot pedal is depressed). The valve assembly 102 in the present disclosure is primarily described as a shut-in type valve assembly. However, other embodiments of the valve assembly 102 can be of different types. In some embodiments, the valve assembly 102 can be a dump type valve. In a dump type valve assembly, when the foot pedal is depressed, the valve closes off an otherwise open port to direct water flowing into the valve to a tool having a nozzle (e.g., a spray gun or cleaning lance). Restriction of flow in the tool causes fluid pressure to rise to an operating pressure when the dump port is closed. When the foot pedal is released, the port opens to keep the water flowing without building up pressure.

In both of the shut-in type valve and the dump type valve, a valve cartridge (e.g., the valve closure element 108) can be biased (e.g., by a spring element) to push back the actuation lever 120 (including the foot pedal) and lift the foot pedal up when not in use (i.e., when released or not depressed). The spring element can be adapted to lift the actuation lever 120 and the safety latch 122 together (with the safety latch 122 covering the actuation lever 120) not to actuate the valve cartridge when not in use.

As described below, a biasing member 124 is configured to bias the safety latch 122 to close against the actuation lever 120 when the actuation lever 120 (e.g., the foot pedal) is in the upward position (e.g., the first lever position). The biasing member 124 can also contribute to a lifting force that causes the actuation lever 120 to return into its upward position (e.g., the first lever position) through the contact end 146 of the safety latch 122 as the actuation lever 120 (i.e., the foot pedal) is released from its depressed position (e.g., the second lever position).

With continued reference to FIGS. 1-4, the actuation device 104 can include an actuation lever 120, a safety latch 122, and a biasing member 124.

In some embodiments, the actuation lever 120 has a first lever portion 130 and a second lever portion 132. The first lever portion 130 of the actuation lever 120 is pivotally connected to the valve body 106 at a pivot point 134. In some examples, a pin 136 can be used to pivotally support the actuation lever 120. The first lever portion 130 has a tang portion 138 configured to engage the head portion 110 of the valve closure element 108 to actuate the valve assembly 102.

The second lever portion 132 provides an interface for an operator to control the actuation lever 120, thereby triggering the valve assembly 102. In some embodiments, the second lever portion 132 is configured as a foot pedal on which an operator steps to depress the actuation lever 120. In other embodiments, the second lever portion 132 is configured to be operated in different manners, such as by hand.

The actuation lever 120 can pivot between a first lever position and a second lever position. In the first lever position, as illustrated in FIGS. 2 and 3, the actuation lever 120 remains unactuated, and the first lever portion 130 (e.g., the tang portion 138) disengages the valve closure element 108 so that the valve closure element is in the first valve position (i.e., the valve assembly 102 is closed). As the actuation lever 120 is actuated by depressing the second lever portion 132, the actuation lever 120 moves to the second lever position as illustrated in FIG. 1, and the first lever portion 130 (e.g., the tang portion 138) engages and pushes the valve closure element 108 so that the valve closure element moves to the second valve position (i.e., the valve assembly 102 is open). As described below, the actuation lever 120 can be biased to the first lever position by the biasing member 124.

With continued reference to FIGS. 1-4, the safety latch 122 includes a first latch portion 140 and a second latch portion 142. The safety latch 122 is pivotally connected to the actuation lever 120 at a pivot point 144 so as to pivot between a first latch position and a second latch position. The pivot point 144 is arranged between the first latch portion 140 and the second latch portion 142 of the safety latch 122. In some embodiments, the pivot point 144 is also arranged between the first lever portion 130 and the second layer portion 132 of the actuation lever 120.

The first latch portion 140 is a portion of the safety latch 122 that extends from the pivot point 144 toward a support surface 90. Where the valve system 100 is configured as a foot-operated valve system, the support surface 90 can be a ground or floor on which the valve system 100 is positioned. The first latch portion 140 is arranged between the actuation lever 122 and the support surface 90.

The first latch portion 140 has a contact end 146, which is an end of the safety latch 122 opposite to the pivot point 144. The contact end 146 of the first latch portion 140 is configured to contact the support surface 90 depending on a position of the safety latch 122 relative to the actuation lever 120 and/or the valve assembly 102. Further, the contact end 146 is configured to move along, or slide on, the support surface 90 as the safety latch 122 changes its position relative to the actuation lever 120 and/or the valve assembly 102, as described below. In some embodiments, the safety latch 122 includes a rolling element 148 arranged at the contact end 146. The rolling element 148 is configured to roll on the support surface 90 as the contact end 146 of the first latch portion 140 moves along the support surface 90. One example of the rolling element 148 is a roller made of acetal. Other embodiments of the rolling element 148 are also possible. In some embodiments, a spacer bush 150 is disposed with the rolling element 148 at the contact end 146.

The second latch portion 142 is a portion of the safety latch 122 that extends from the pivot point 144 at a side opposite to the first latch portion 140. In some embodiments, the first and second latch portions 140 and 142 generally form an L-shape, as illustrated in FIGS. 1-4. Other configurations of the safety latch 122 are also possible. In some embodiments, the second latch portion 142 is configured to cover at least a portion of the second lever portion 132 of the actuation lever 120 in the first latch position.

The second latch portion 142 has a lifting end 152 configured to extend over the second lever portion 132 when the safety latch 122 is in the first latch position (i.e., the actuation lever 120 is in the first lever position). The lifting end 152 is used as an interface for an operator to raise the safety latch 122 from the first latch position to the second latch position. For example, as illustrated in FIGS. 9-12, an operator can engage his or her toe with the lifting end 152 and lift up the safety latch 122 with the toe.

Figure 8:
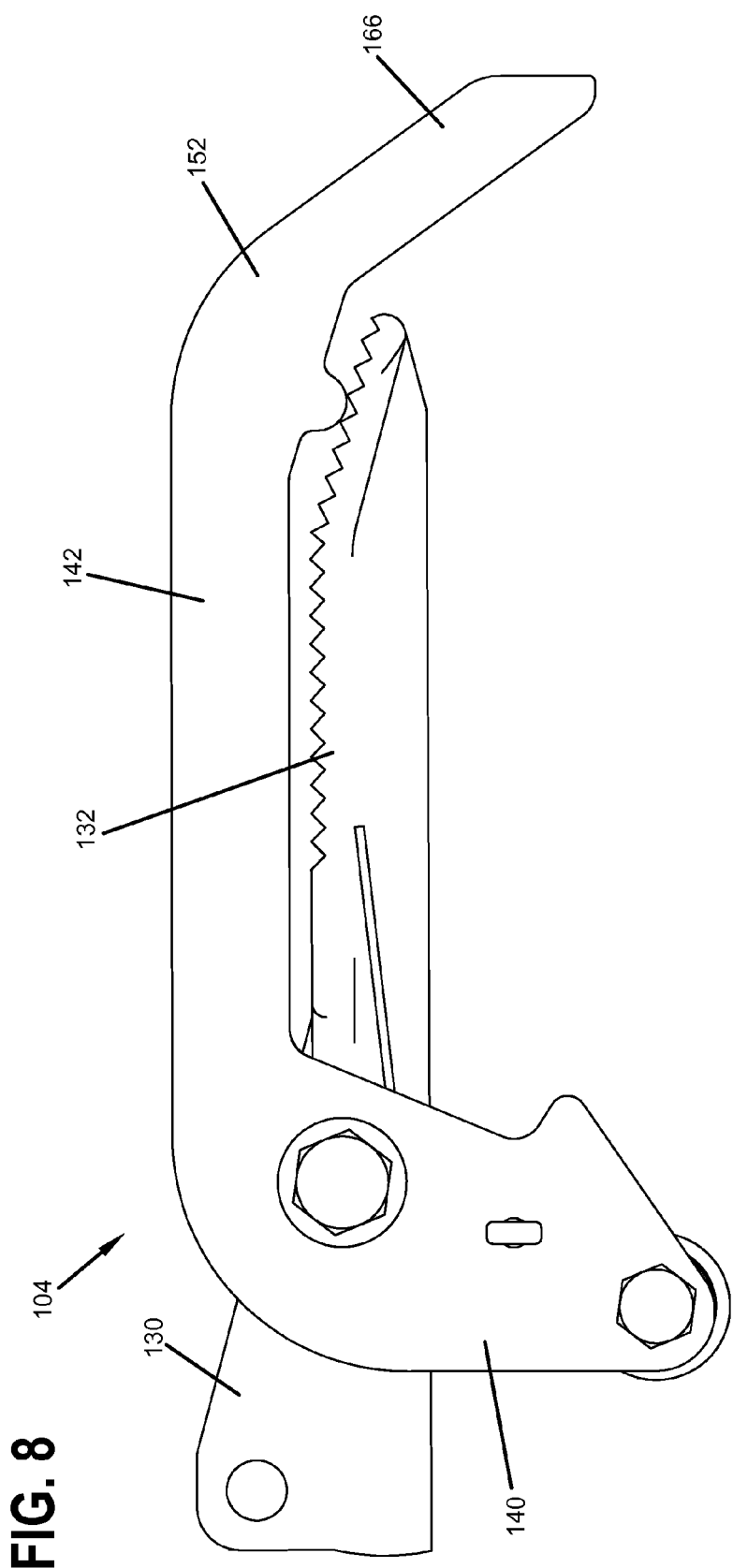
FIG. 8 illustrates another example of the actuation device.

As illustrated in FIG. 8, the lifting end 152 can include a hooked portion 166 that extends from the second latch portion 142. The hooked portion 166 is configured to further extend over the free end of the second lever portion 132 of the actuation lever 120. This configuration can ease the lifting of the safety latch 122. For example, where the valve system 100 is configured to be foot-operated, the hooked portion 166 can prevents an operator's foot from being inadvertently engaged with the second lever portion 132 before lifting the safety latch 122. The hooked portion 166 can rather lead the operator's foot under the actuation lever 120 (e.g., the foot pedal), and enable the foot to first lift the safety latch 1222 before operating the actuation lever 120.

The safety latch 122 can pivot between the first latch position and the second latch position. In the first latch position, as illustrated in FIGS. 2 and 3, the second latch portion 142 of the safety latch 122 covers at least a portion of the second lever portion 132, which is in the first lever position (i.e., the actuation lever 120 is in an unactuated position). In the first latch position, the contact end 146 of the first latch portion 140 can be in contact with the support surface 90, in some embodiments. In other embodiments, in the first latch position, the contact end 146 of the first latch portion 140 is adjacent the support surface 90 but is not in contact with the support surface 90.

As such, when the safety latch 122 is in the first latch position, the actuation lever 120 is in the first lever position, and the valve assembly 102 remains closed, because the valve closure element 108 is not actuated by the actuation lever 120. This configuration can be referred to herein as the actuation device 104 being in a first position. In this document, therefore, the first position, the first latch position, and the first lever position can be interchangeably used to refer to the same position of the valve system 100 and the associated elements therein.

The safety latch 122 in the first latch position can prevent the actuation lever 120 from pivoting from the first lever position to the second lever position, due to the geometry of the safety latch 122 in the first latch position. As illustrated in FIG. 3, a distance D1 between the pivot point 144 and the contact end 146 of the first latch portion 140 is configured such that the actuation lever 120 remains in the first lever position when the safety latch 122 is in the first latch position. When the second latch portion 140 is depressed at the first latch position, the first latch portion 140 is pressed against the support surface 90 with the contact end 146 contacting the support surface 90. The first latch portion 140 stands against the support surface 90 and resist the depressing force against the safety latch 122 (i.e., the second latch portion 140 thereof). Thus, the actuation lever 120 is prevented from moving toward the second lever position, thereby prohibiting the actuation of the valve assembly 102. In other embodiments, when the second latch portion 140 is depressed from the first latch position, the contact end 146 contacts a front surface of the valve box 106 to resist the depressing force. In yet other embodiments, where a cover 159 (FIG. 9) is provided around the actuation device 104, the contact end 146 can contact a front wall 160 (FIG. 5) of the cover 159 as the second latch portion 140 is depressed.

Figure 6:
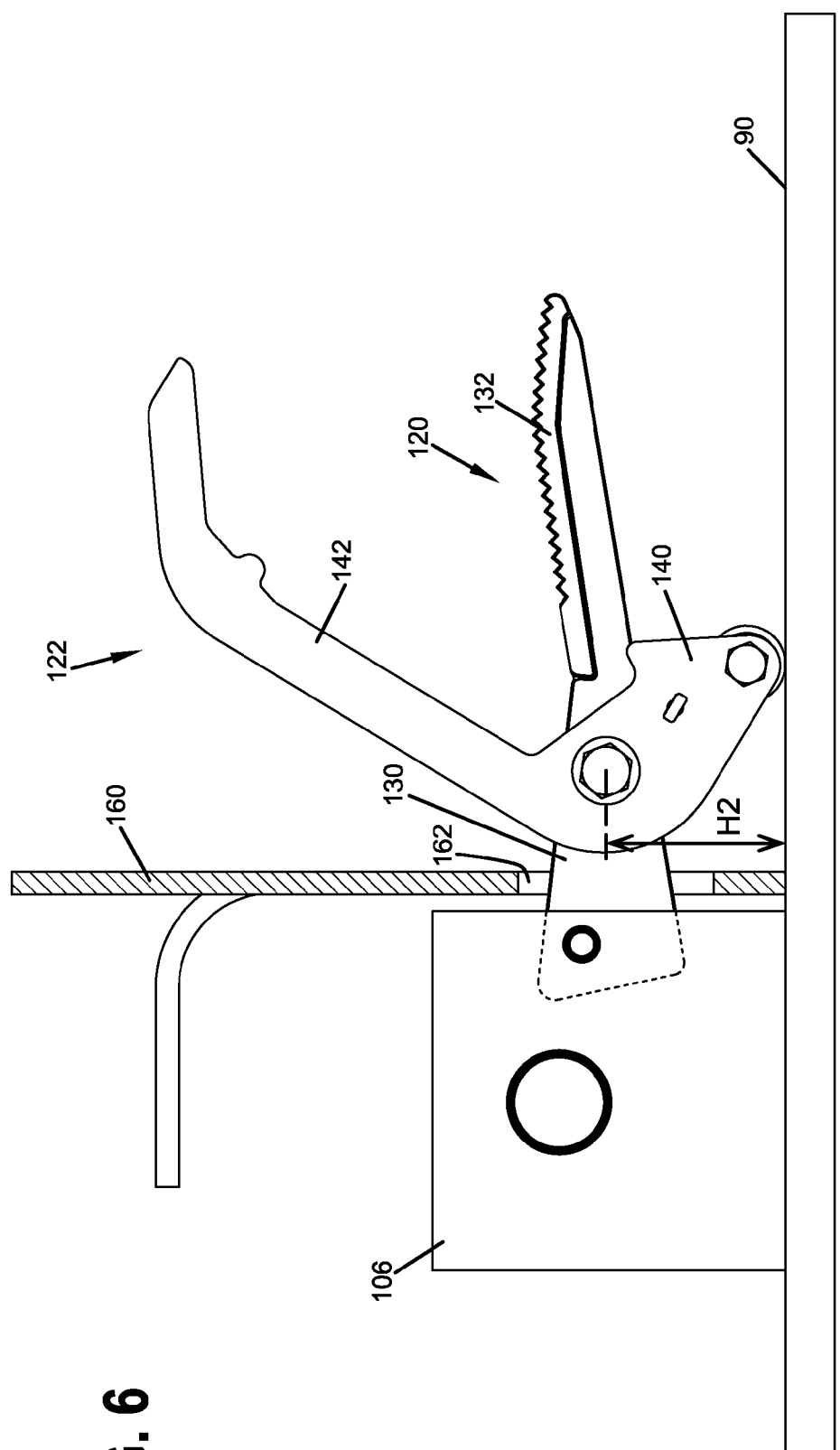
FIG. 6 illustrates that the actuation device is in a second position.
Figure 7:
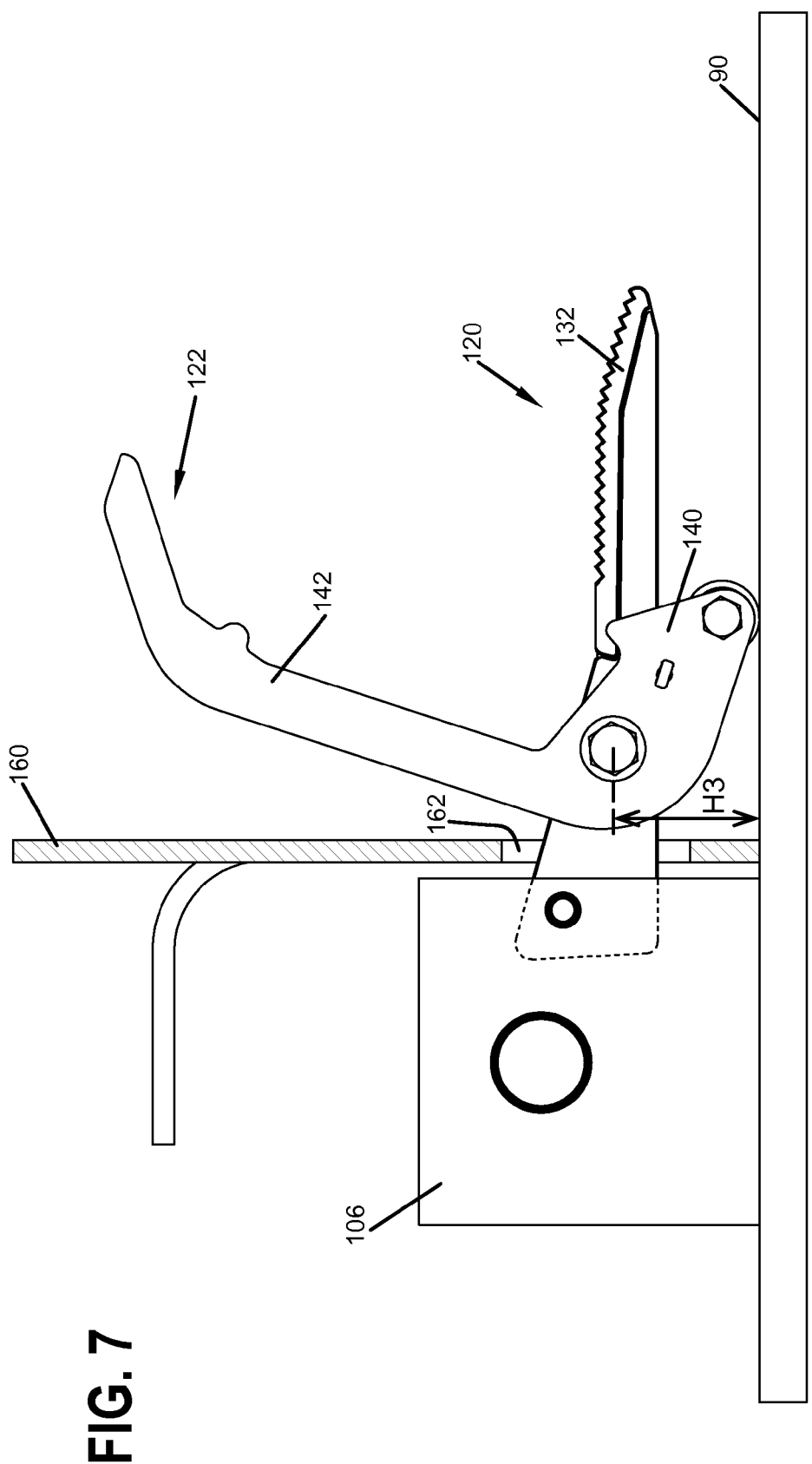
FIG. 7 illustrates that the actuation device is in a third position.

As the safety latch 122 is raised by lifting up the lifting end 152 of the second latch portion 142, the safety latch 122 moves from the first latch position to the second latch position as illustrated in FIG. 1 (and FIGS. 6 and 7). While moving from the first latch position to the second latch position, the first latch portion 140 moves along the support surface 90 away from the valve assembly 102. As the first latch portion 140 moves away from the valve assembly 102, a height H of the pivot point 144 from the support surface 90 decreases so that the actuation lever 120 is lowered from the first lever position toward the second lever position (close to the support surface 90). As the safety latch 122 moves from the first latch position toward the second latch position (e.g., a position as illustrated in FIG. 6), the second latch portion 142 is lifted up enough to expose the second lever portion 132 and enable an operator to access the second lever portion 132 and depress it to the second lever position.

As described below, the safety latch 122 can be biased to the first latch position while the actuation lever 120 is biased to the first lever position.

With continued reference to FIGS. 1-4, the biasing member 124 is engaged between the actuation lever 120 and the safety latch 124 to bias the actuation lever 120 to the first lever position and the safety latch 122 to the first latch position. The biasing member 124 can be of various types. By way of example, the biasing member 124 is a torsion spring having a coil portion and two prongs. The coil portion can be disposed coaxially with the pivot point 144 while the prongs rest against the actuation lever 120 and the safety latch 122, respectively. For examples, a first prong 154 of the torsion spring engages a bottom surface of the second lever portion 132 while a second prong 156 of the torsion spring engages a support structure 158 (e.g., a transverse pin) disposed along the width of the second latch portion 140. Other configurations are also possible in other embodiments.

Figure 5:
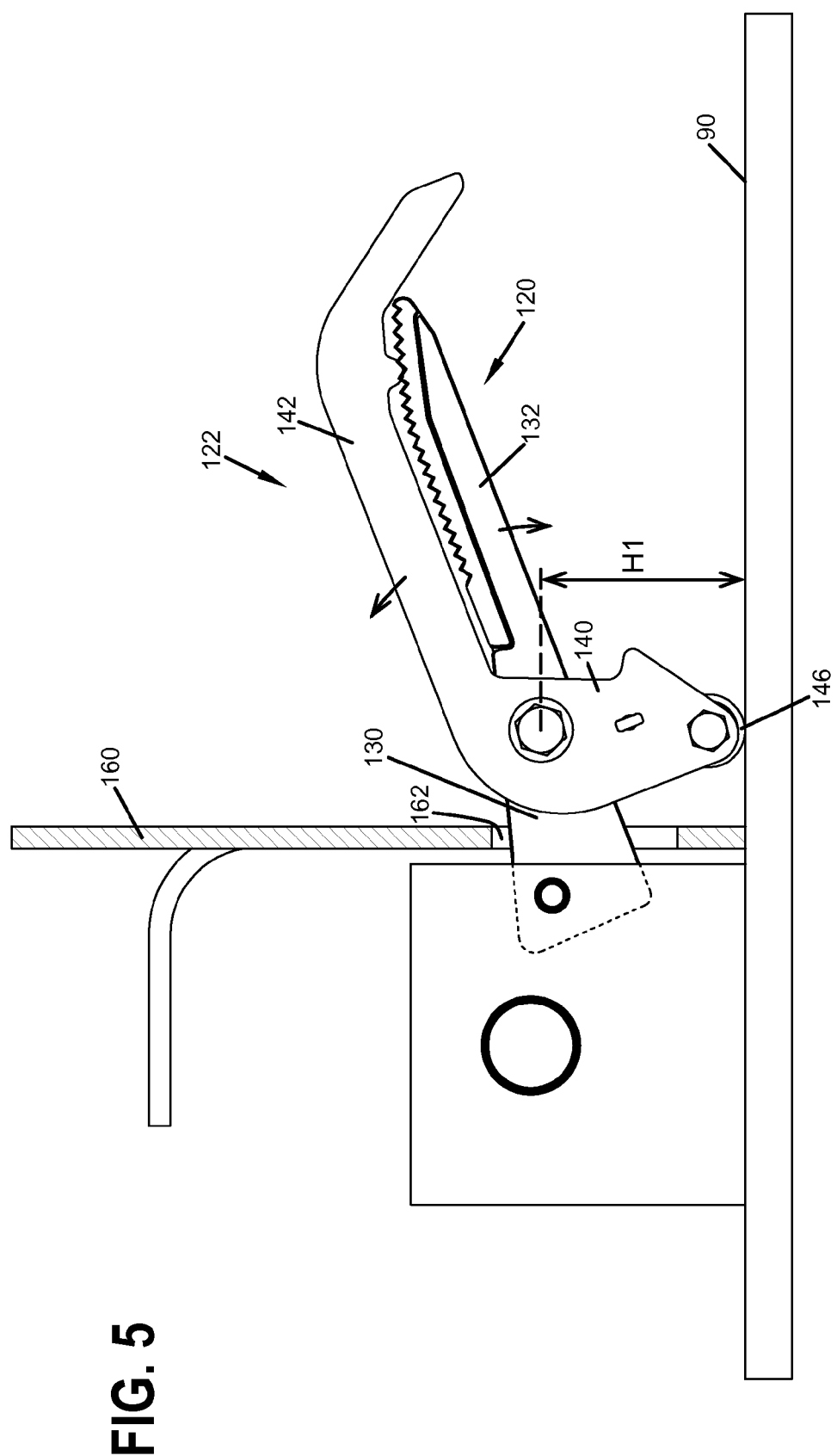
FIG. 5 illustrates that the actuation device is in a first position.

Referring to FIGS. 5-7, an example operation of the valve system 100 is described. In particular, FIG. 5 illustrates the actuation device 104 is in a first position, FIG. 6 illustrates the actuation device 104 is in a second position, and FIG. 7 illustrates the actuation device 104 is in a third position.

In some embodiments, the valve system 100 includes a safety cover 159 (FIGS. 9-12) configured to at least partially surround the actuation device 104. An example of the safety cover is described in U.S. Pat. No. 6,182,686, titled FOOT VALVE SAFETY COVER APPARATUS, issued Feb. 6, 2001, the disclosure of which is incorporated herein by reference in its entirety. The safety cover 159 includes a wall 160 configured to divide the valve assembly 102 and the actuation device 104. The wall 160 defines a slot 162 through which the first lever portion 130 of the actuation lever 120 extends.

As described herein, the actuation device 104 is operated in two stages. For example, the actuation device 104 moves from the first position (FIG. 5) to the second position (FIG. 6) in the first stage, and subsequently from the second position to the third position (FIG. 7) in the second stage. The two-stage actuation device 104 according to the present disclosure can prevent an operator from inadvertently actuating the valve system 102 by stepping on the actuation lever 120. The actuation lever 120 cannot be depressed when the safety latch 122 is in the first position (i.e., when the safety latch 122 covers the actuation lever 120). Operators need to get properly balanced and in position to raise the safety latch 122 to gain access to the actuation lever 120 and then operate the actuation lever 120 to actuate the valve assembly 102.

When the actuation device 104 is in the first position, as illustrated in FIG. 5, the actuation lever 120 is in the first lever position, and the safety latch 122 is in the first latch position, as described above. In the first position, the tang portion 138 of the actuation lever 120 is apart from the head portion 110 of the valve closure element 108, and thus the valve assembly 102 remains closed. As described herein, in the first position, the safety latch 122 covers the second lever portion 132 to prohibit access to the second lever portion 132. When the safety latch 122 is depressed, for example, by an operator who accidentally steps down on the second latch portion 142 of the safety latch 122, the first latch portion 140 functions to resist the depressing force with the contact end 146 abutted to the support surface 90 (or the wall 160 of the safety cover), thereby preventing the actuation lever 120 from moving to the second lever position to actuate the valve closure element 108.

When the safety latch 122 is lifted from the actuation lever 120, the actuation device 104 moves from the first position (FIG. 5) to the second position (FIG. 6). As illustrated in FIG. 9, the safety latch 122 can be raised when an operator lifts up the lifting end 152 of the second lever portion 142 with the operator's toe or hand. Where the biasing member 124 is used, the safety latch 122 is lifted against a restoring force of the biasing member 124.

The second position of the actuation device 104, as illustrated in FIG. 6, is a position between the first and third positions. In particular, FIG. 6 shows that the actuation device 104 transitions between the first position (FIG. 5) and the third position (FIG. 7). In the second position, the safety latch 122 is in a position between the first latch position and the second latch position, and the actuation lever 120 is in a position between the first lever position and the second lever position. In the second position, the safety latch 122 is lifted up such that the second lever portion 132 (e.g., a foot pedal) is accessible by an operator. In the second position, the contact end 146 of the first latch portion 140 has moved away from the valve assembly 102, and a height H2 of the pivot point 144 from the support surface 90 has decreased from the height H1 of the pivot point 144 in the first position (FIG. 5) (i.e., the second lever portion 132 becomes closer to the support surface 90).

In some embodiments, although the actuation lever 120 moves away the first lever position, the actuation lever 120 does not engage the valve closure element 108 yet in the second position. In other embodiments, the actuation device 104 can be configured such that the actuation lever 120 at least slightly engages the valve closure element 108 to actuate it to at least partially open the valve assembly 102 when it is in the second position. Other configurations are also possible in yet other embodiments.

When the actuation device 104 is in the third position, as illustrated in FIG. 7, the actuation lever 120 is in the second lever position, and the safety latch 122 is in the second latch position, as described above. In some embodiments, the actuation lever 120 is fully depressed and the safety latch 122 is completely out of the way. In the third position, the tang portion 138 of the actuation lever 120 engages the head portion 110 of the valve closure element 108 and actuates the valve closure element 108 to open the valve assembly 102.

In some embodiments, the actuation lever 120 can move to the second lever position when an operator depresses the second lever portion 132 (e.g., by stepping down on the foot pedal thereof). As the second lever portion 132 is lowered, a height H3 of the pivot point 144 from the support surface 90 further decreases (i.e., the height H3 is smaller than the height H2, which is smaller than the height H1), and the contact end 146 of the first latch portion 140 slides along the support surface 90 further away from the valve assembly 102. Accordingly, the second latch portion 142 of the safety latch 122 is further lifted up.

As such, once the safety latch 122 is lifted up to a certain level (e.g., to the second position of the actuation device 104 as illustrated in FIG. 6), the action of depressing the actuation lever 120 (e.g., the second lever portion 132 thereof) can automatically rotates the safety latch 122 further about the pivot point 144 so that the safety latch 122 further opens up for access to the actuation lever 120. Therefore, it is not necessary to fully lift the safety latch 122 before operating the actuation lever 120.

In some embodiments, the actuation device 104 returns from the third position to the first position when the actuation lever 120 is released. For example, the actuation lever 120 is depressed and the safety latch 122 is lifted by overcoming the restoring force generated by the biasing member 124. Once the operator releases the actuation lever 120 (e.g., removing the operator's step from the second lever portion 132), the actuation lever 120 and the safety latch 122 returns to the first lever position and the first latch position, respectively, by the biasing member 124.

FIGS. 9-12 illustrate an example operation of the actuation device 104 using an operator's foot (or shoe) F. In this illustration, the actuation device 104 is used with a foot-operated valve assembly 102. The actuation device 104 is surrounded by the safety cover 159.

Referring to FIG. 9, the actuation device 104 is in the first position. The operator can slide the foot F under the actuation device 104. The lifting end 152 (or the hooked portion 166 thereof) is configured to first contact the toe of the foot F. The operator can then raise the safety latch 122 with the toe of the foot F. The safety latch 122 is lifted until the actuation device 104 is in the second position as illustrated above in FIG. 6. FIG. 10 also illustrates that the actuation device 104 has moved to the second position as the safety latch 122 is lifted. When the actuation device 104 is in the second position, the actuation lever 120 is exposed and becomes accessible by the foot F. As illustrated in FIG. 11, the operator can then depress the actuation device 104 by stepping down on the second lever portion 132 (e.g., the foot pedal). When the actuation lever 120 is completely depressed to the second lever position (i.e., when the actuation device 104 is in the third position), as illustrated in FIG. 12, the safety latch 122 is further lifted. Once the operator removes the foot F from the actuation device 104 to release the actuation lever 120, the safety latch 122 returns to the first latch position and the actuation lever 120 returns to the first lever position by the biasing member 124, so that the actuation device 104 returns to the first position as illustrated in FIGS. 5 and 9.

It will be understood that, although the terms first, second, third etc. may be used herein to describe various elements, components, positions, regions, layers and/or sections, these elements, components, positions, regions, layers and/or sections should not be limited by these terms. These terms are only used to distinguish one element, component, position, region, layer or section from another element, component, region, layer or section. Thus, a first element, component, region, layer or section discussed below could be termed a second element, component, region, layer or section without departing from the teachings of the disclosure.

In the present disclosure, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. An apparatus for actuating a valve assembly, the apparatus comprising:
   an actuation lever having a first lever portion and a second lever portion, the actuation lever pivotally connected to the valve assembly at the first lever portion, and the second lever portion operated such that the actuation lever pivots between a first lever position and a second lever position, wherein, in the first lever position, the first lever portion disengages the valve assembly to prevent fluid flow through the valve assembly, and wherein, in the second lever position, the first lever portion engages the valve assembly to permit fluid flow through the valve assembly;
   a safety latch having a first latch portion and a second latch portion, the safety latch pivotally connected to the actuation lever at a pivot point, the pivot point arranged between the first lever portion and the second lever portion, the safety latch configured to pivot between a first latch position and a second latch position, wherein, in the first latch position, the actuation lever is in the first lever position, the second latch portion covers at least a portion of the second lever portion, and the first latch portion is configured to prevent the actuation lever from pivoting from the first lever position to the second lever position, and wherein, in the second latch position, the second latch portion is lifted away from the second lever portion and the actuation lever is in the second lever position; and
   a biasing member engaged between the actuation lever and the safety latch and configured to bias the actuation lever to the first lever position and the safety latch to the first latch position,
   wherein the safety latch is configured such that, when the second lever portion of the actuation lever is depressed to the second lever position, the second latch portion is further lifted away from the second lever portion to move to the second latch position.

2. The apparatus of claim 1, wherein the safety latch is configured such that, as the second latch portion is lifted from the first latch position toward the second latch position, the second lever portion of the actuation lever becomes accessible to operate the actuation lever to the second lever position.

3. The apparatus of claim 1, wherein the safety latch is pivotally connected to the actuation lever at a pivot point arranged between the first latch portion and the second latch portion.

4. The apparatus of claim 3, wherein the first latch portion has a contact end configured to move along a support surface as the safety latch moves between the first and second latch positions.

5. The apparatus of claim 4, wherein the contact end includes a rolling element.

6. The apparatus of claim 4, wherein, when the first latch portion is depressed toward the second lever portion of the actuation lever at the first latch position, the contact end of the first latch portion is in contact with the support surface and resists the depressing force.

7. The apparatus of claim 1, wherein the safety latch is configured such that, as the second latch portion is lifted from the first latch position, the first latch portion moves along the support surface away from the valve assembly, and the actuation lever pivots relative to the valve assembly to generally move the second lever portion of the actuation lever close to the support surface.

8. The apparatus of claim 1, wherein the second lever portion of the actuation lever includes a pedal adapted to be operated by foot.

9. The apparatus of claim 1, further comprising the valve assembly, the valve assembly including:
a valve body; and
a valve closure element received in the valve body, the valve closure element movable between a first valve position in which the valve closure element closes the valve assembly to prevent fluid flow therethrough and a second valve position in which the valve closure element opens the valve assembly to permit fluid flow therethrough.

10. A method of actuating a valve assembly, the method comprising:
providing an actuation device, the actuation device including:
an actuation lever having a first lever portion and a second lever portion and pivotally connected to the valve assembly at the first lever portion;
a safety latch having a first latch portion and a second latch portion, the safety latch pivotally connected to the actuation lever at a pivot point between the first and second latch portions, the pivot point arranged between the first lever portion and the second lever portion; and
a biasing member engaged between the actuation lever and the safety latch;
raising the second latch portion of the safety latch from a first latch position to pivot about the actuation lever until the second lever portion is accessible;
depressing the second lever portion of the actuation lever from a first lever position to enable the actuation lever to pivot about the valve assembly until the first lever portion engages and actuates the valve assembly to permit fluid flow therethough; and
releasing the second lever portion of the actuation lever to enable the actuation lever return to the first lever position and the safety latch to return to the first latch position by the biasing member.

11. The method of claim 10, wherein raising the second latch portion comprises:
raising the second latch portion to pivot about the actuation lever until the second lever portion is accessible before the first lever portion of the actuation lever engages the valve assembly.

12. The method of claim 10, wherein depressing the second lever portion comprises:
depressing the second lever portion to enable the second latch portion to be further raised as the actuation lever pivots about the valve assembly until the first lever portion engages and actuates the valve assembly.

13. The method of claim 10, wherein:
the first latch portion has a contact end configured to move along a support surface as the safety latch is raised; and
when the first latch portion is depressed toward the second lever portion of the actuation lever at the first latch position, the contact end of the first latch portion is in contact with the support surface and resist the depressing force.

14. The method of claim 10, wherein raising the second latch portion comprises:
raising the second latch portion to pivot about the actuation lever to enable the first latch portion to move along a support surface and pivot the actuation lever relative to the valve assembly to generally move the second lever portion of the actuation lever toward the support surface.

15. A valve system comprising:
a valve assembly including a valve body and a valve closure element received in the valve body, the valve closure element movable between a first valve position in which the valve closure element closes the valve assembly to prevent fluid flow therethrough and a second valve position in which the valve closure element opens the valve assembly to permit fluid flow therethrough;
an actuation lever having a first lever portion and a second lever portion, the actuation lever pivotally connected to the valve body at the first lever portion, and the second lever portion operated such that the actuation lever pivots between a first lever position and a second lever position, wherein, in the first lever position, the first lever portion disengages the valve assembly to prevent fluid flow through the valve assembly, and wherein, in the second lever position, the first lever portion engages the valve assembly to permit fluid flow through the valve assembly;
a safety latch having a first latch portion and a second latch portion, the safety latch pivotally connected to the actuation lever at a pivot point, the pivot point arranged between the first lever portion and the second lever portion, the safety latch configured to pivot between a first latch position and a second latch position, wherein, in the first latch position, the actuation lever is in the first lever position, the second latch portion covers at least a portion of the second lever portion, and the first latch portion is configured to prevent the actuation lever from pivoting from the first lever position to the second lever position, and wherein, in the second latch position, the second latch portion is lifted away from the second lever portion and the actuation lever is in the second lever position; and
a biasing member engaged between the actuation lever and the safety latch and configured to bias the actuation lever to the first lever position and the safety latch to the first latch position,
wherein the safety latch is configured such that, when the second lever portion of the actuation lever is depressed to the second lever position, the second latch portion is further lifted away from the second lever portion to move to the second latch position.

16. The valve system of claim 15, wherein the safety latch is configured such that, as the second latch portion is lifted from the first latch position toward the second latch position, the second lever portion of the actuation lever becomes accessible to operate the actuation lever to the second lever position.

17. The valve system of claim 15, wherein:
the safety latch pivotally connected to the actuation lever at a pivot point arranged between the first latch portion and the second latch portion;

the first latch portion has a contact end configured to move along the support surface as the safety latch moves between the first and second latch positions; and when the first latch portion is depressed toward the second lever portion of the actuation lever at the first latch position, the contact end of the first latch portion is in contact with the support surface and resist the depressing force.

18. The valve system of claim 15, wherein the safety latch is configured such that, as the second latch portion is lifted from the first latch position, the first latch portion moves along the support surface away from the valve assembly, and the actuation lever pivots relative to the valve assembly to generally move the second lever portion of the actuation lever close to the support surface.

19. The apparatus of claim 1, wherein the safety latch includes a lifting end at the second latch portion, the lifting end configured to extend over the second lever portion of the actuation lever when the safety latch is in the first latch position.

20. The valve system of claim 15, further comprising: a safety cover at least partially surrounding the actuation lever, the safety latch, and the biasing member, the safety cover including a wall dividing the valve assembly at least partially from the actuation lever, the safety latch, and the biasing member.

* * * * *